United States Patent [19]
Allen et al.

[11] Patent Number: 5,913,084
[45] Date of Patent: Jun. 15, 1999

[54] ONE-TIME-USE CAMERA WITH SHUTTER, FLASH, AND OPTICAL FILM ENCODEMENT SYNCHRONIZATION

[75] Inventors: Michael R. Allen, Churchville; Jude A. Sangregory, Rochester, both of N.Y.

[73] Assignee: Eastman Kodak Company, Rochester, N.Y.

[21] Appl. No.: 08/892,287

[22] Filed: Jul. 14, 1997

[51] Int. Cl.⁶ .................................................. G03B 17/24
[52] U.S. Cl. ........................... 396/195; 396/180; 396/315
[58] Field of Search .................................... 396/315, 195, 396/180

[56] References Cited

U.S. PATENT DOCUMENTS

| | | | |
|---|---|---|---|
| 3,812,508 | 5/1974 | Matsuda et al. | 396/315 |
| 3,889,281 | 6/1975 | Taguchi et al. | 396/315 |
| 3,953,868 | 4/1976 | Kawamura et al. | 395/315 |
| 4,025,931 | 5/1977 | Taguchi et al. | 396/315 |
| 4,074,294 | 2/1978 | Fujita et al. | 396/315 |
| 4,235,544 | 11/1980 | Yamada et al. | 396/315 |
| 4,327,979 | 5/1982 | Tominaga et al. | 396/315 |
| 4,493,547 | 1/1985 | Bridges | 396/315 |
| 5,534,962 | 7/1996 | Zamdor | 396/315 |
| 5,619,737 | 4/1997 | Horning et al. | 396/315 |
| 5,717,968 | 2/1998 | Stephenson, III et al. | 396/315 |

*Primary Examiner*—Russell Adams
*Assistant Examiner*—Michael Dalaku
*Attorney, Agent, or Firm*—Roger A. Fields

[57] ABSTRACT

A camera comprises flash circuit board, a shutter-flash synchronization contact conductively connected to the flash circuit board for synchronizing shutter opening and flash illumination, a shutter blade conductively connected to the flash circuit board and movable in a single direction against the synchronization contact as an incident of shutter opening to initiate flash illumination, and an optical film encoder conductively connected to the flash circuit board to receive electrical energy to provide film encoding illumination when the shutter blade is moved against the synchronization contact. The synchronization contact has a resilient extension-contact positioned for the shutter blade to move in the single direction against the extension-contact as an incident of shutter opening to initiate flash illumination and to permit the optical film encoder to begin to receive electrical energy to provide film encoding illumination, and positioned to remain in touch with the shutter blade during further movement of the shutter blade in the single direction to permit the optical film encoder to continue to receive electrical energy for providing film encoding illumination.

4 Claims, 4 Drawing Sheets

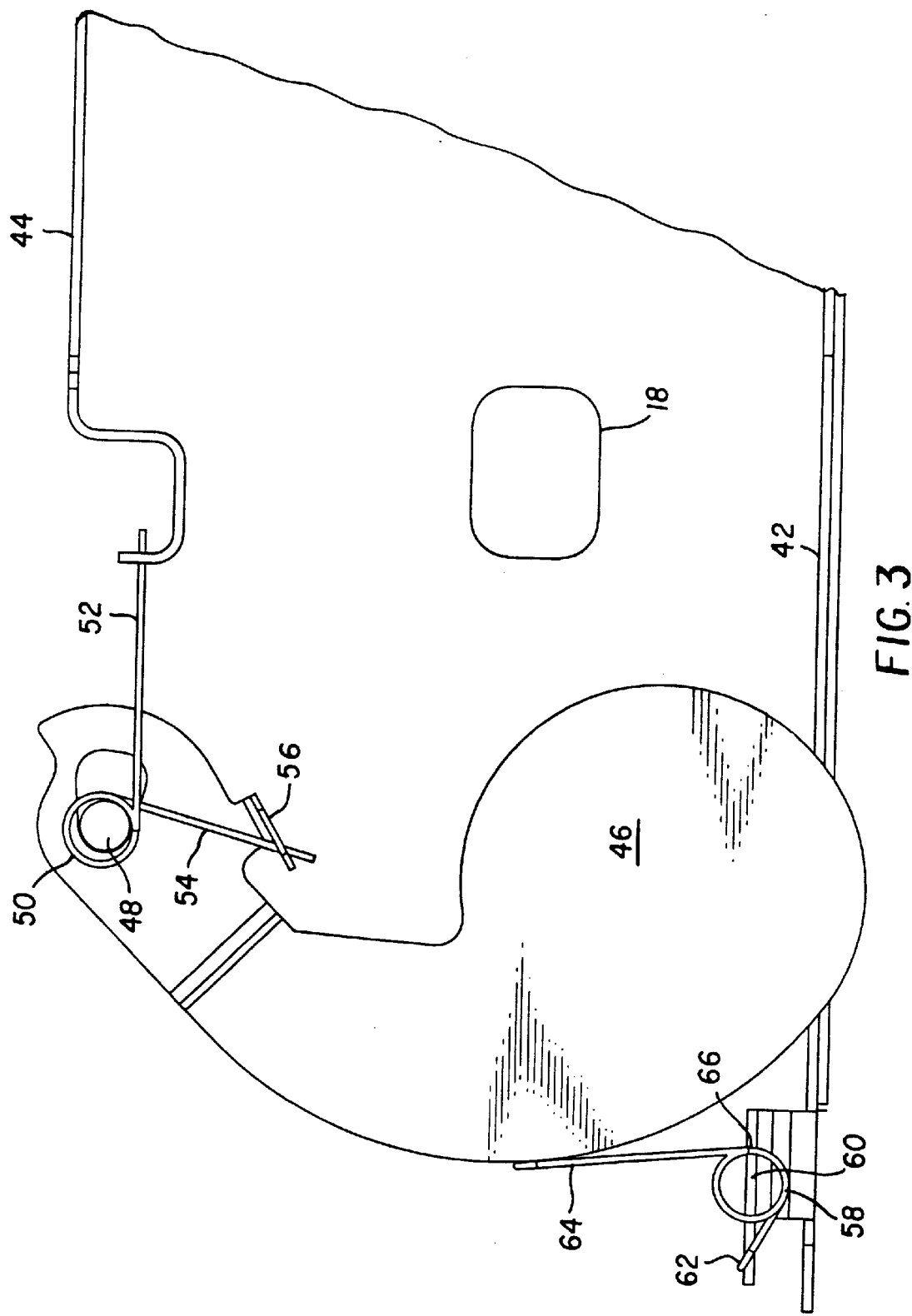

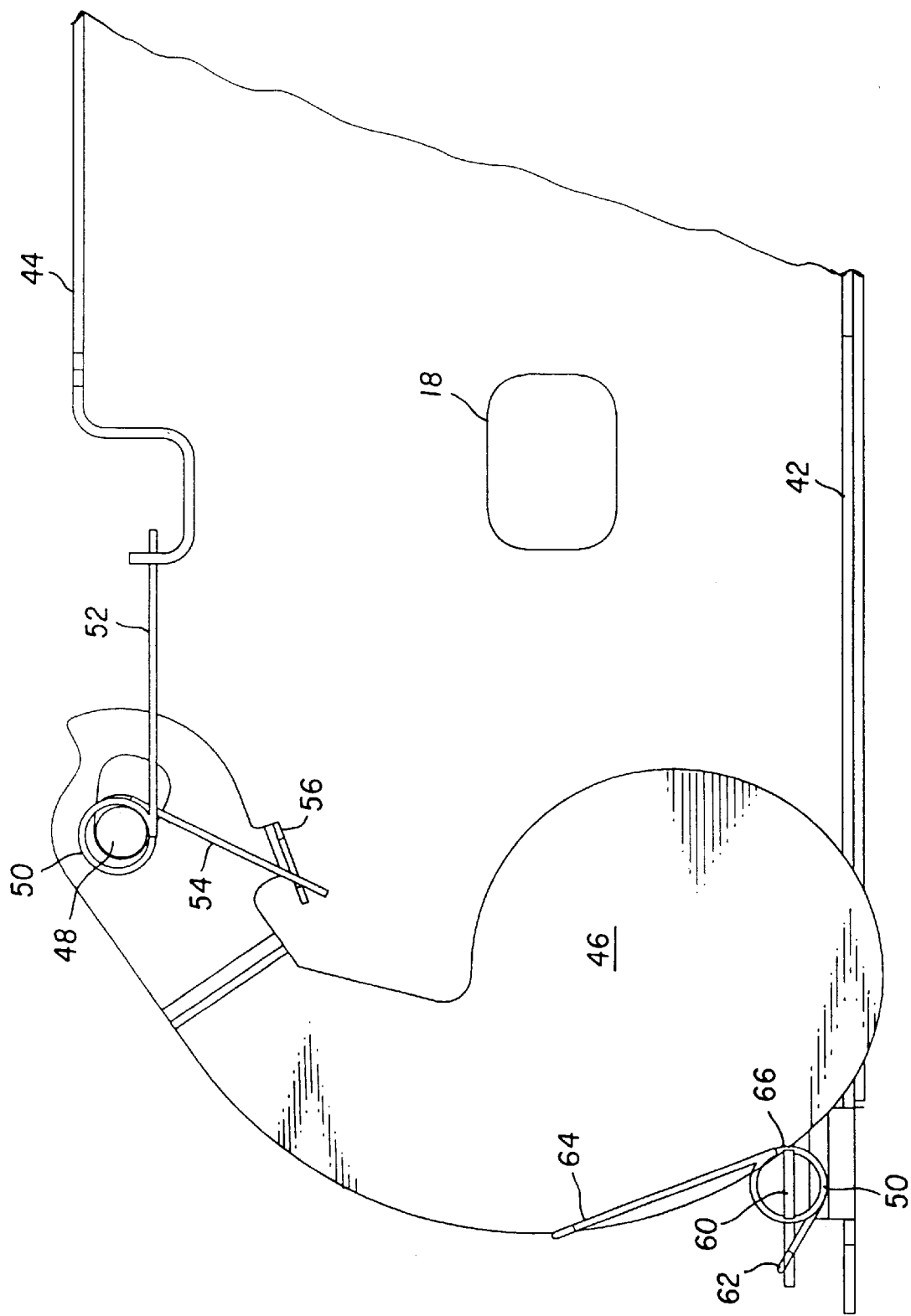

ONE-TIME-USE CAMERA WITH SHUTTER, FLASH, AND OPTICAL FILM ENCODEMENT SYNCHRONIZATION

CROSS-REFERENCE TO RELATED APPLICATION

Reference is made to commonly assigned copending application Ser. No. 08/822,094, entitled OPTICAL DATA RECORDING CIRCUIT FOR A PHOTOGRAPHIC CAMERA and filed Mar. 20, 1997 in the name of Douglas W. Constable, which is a continuation of abandoned application Ser. No. 08/610,645 filed Mar. 4, 1996 (originating as provisional application Ser. No. 60/001,678 filed Jul. 31, 1995).

The cross-referenced application is incorporated in this application.

FIELD OF THE INVENTION

The invention relates generally to the field of photography, and in particular to one-time-use cameras. More specifically, the invention relates to a one-time-use camera with a switch means for synchronizing shutter opening, flash illumination, and optical film encoding.

BACKGROUND OF THE INVENTION

Cameras in the recently introduced "Advanced Photo System" give you not just one print format, but a choice of three. For the classic proportions of a 35 mm print, the photographer chooses the "C" format. For a wider view, the full-frame "H" format is chosen. And for an even wider look, the "P" format is chosen to provide a sweeping panoramic print. The camera records the choice of format magnetically and/or optically on the filmstrip for each exposure. The photofinisher's equipment then reads this data, and automatically prints each print in the selected format. A "C" format print is typically 4×6 inches. An "H" format print is typically 4×7 inches. And a "P" format print is typically 4×10 inches or 4×11.5 inches.

No matter which format is chosen in the camera, the exposed image areas on the filmstrip are always in the "H" format. This allows reprints to be made in any of the different formats. However, in order for the photographer to know how much of the subject will be included in the print, the viewfinder in the camera includes an adjustable masking device for framing the subject according to the selected format.

A simple one-time-use camera intended for the "Advanced Photo System" is disclosed in commonly assigned U.S. Pat. No. 5,619,737 issued Apr. 8, 1997. The camera includes a flash circuit board, a shutter-flash synchronization contact conductively connected to the flash circuit board for synchronizing shutter full-opening and flash illumination, and a single shutter blade conductively connected to the flash circuit board and movable simultaneous with shutter full-opening against a stop tang of the synchronization contact to initiate flash illumination. A pair of light-emitting diodes for exposing the choice of format on the filmstrip are conductively connected to the flash circuit board. The light-emitting diodes receive electrical energy from a flash capacitor mounted on the flash circuit board, to provide film encoding illumination to expose the choice on the filmstrip, when the shutter blade is moved against the stop tang of the synchronization contact. A possible problem is that, since the shutter blade touches the stop tang only for a brief instant, for example 100 microseconds, before beginning shutter closing, electrical energy the flash capacitor supplies to the light-emitting diodes is negligible, and therefore may not be sufficient for the light-emitting diodes to provide enough illumination to expose the choice of format on the filmstrip.

Commonly assigned U.S. Pat. No. 5,619,737 is incorporated in this application.

The Cross-Referenced Application

The cross-referenced application discloses an electrical circuit for use in commonly assigned U.S. Pat. No. 5,619,737.

SUMMARY OF THE INVENTION

A camera comprising a flash circuit board, a shutter-flash synchronization contact conductively connected to the flash circuit board for synchronizing shutter opening and flash illumination, a shutter blade conductively connected to the flash circuit board and movable in a single direction against the synchronization contact as an incident of shutter opening to initiate flash illumination, and an optical film encoder conductively connected to the flash circuit board to receive electrical energy to provide film encoding illumination when the shutter blade is moved against the synchronization contact, is characterized in that:

the synchronization contact has a resilient extension-contact positioned for the shutter blade to move in the single direction against the extension-contact as an incident of shutter opening to initiate flash illumination and to permit the optical film encoder to begin to receive electrical energy to provide film encoding illumination, and positioned to remain in touch with the shutter blade during further movement of the shutter blade in the single direction to permit the optical film encoder to continue to receive electrical energy for providing film encoding illumination.

BRIEF DESCRIPTION OF THE DRAWINGS

FIGS. 2, 3 and 4 are elevation views of a means for synchronizing shutter opening, flash illumination, and optical film encoding in the camera, depicting a sequence of operation of the means.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
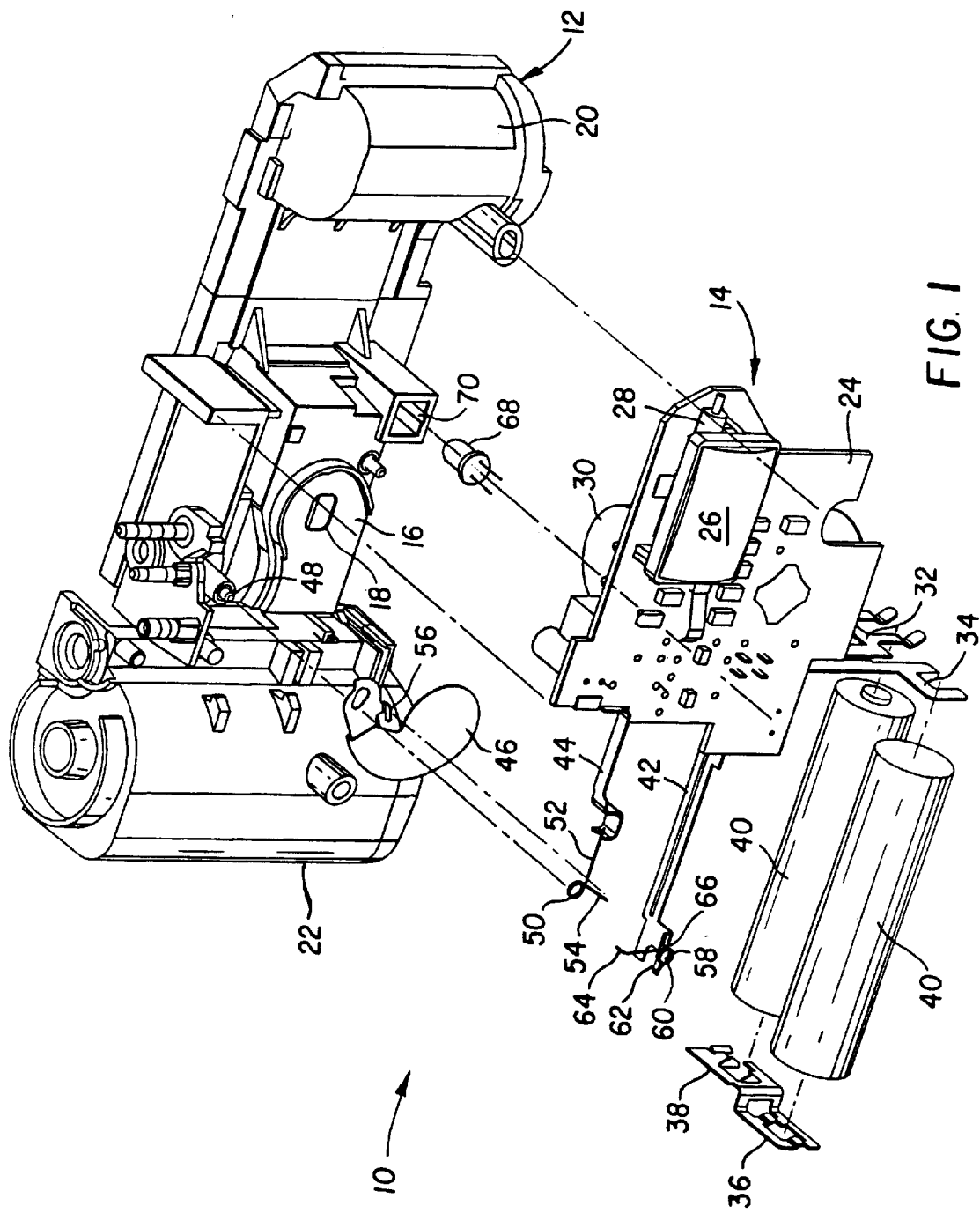
FIG. 1 is a front perspective view of a partially shown one-time-use camera according to a preferred embodiment of the invention.

Referring now to the drawings, FIG. 1 partially shows a one-time-use camera 10 including a plastic main body part 12 and an electronic flash assembly 14. A pair of plastic front and rear cover parts for the main body part 12 and the electronic flash assembly 14 are not shown.

The main body part 12 has a film exposure compartment 16 for receiving ambient or flash light reflected from a subject being photographed, through a front aperture 18 in the compartment, to expose successive image areas of a filmstrip over a backframe opening (not shown) at the rear of the compartment. See FIG. 1. A film roll chamber 20 for an unexposed film roll (not shown) and a cartridge chamber 22 for an exposed film cartridge (not shown) are spaced from opposite sides of the compartment 16.

The electronic flash assembly 14 includes a substantially flat flash circuit board 24 which has a known type flash and light-emitting diode circuitry (not shown) and is fixed to the main body part 12 as indicated in FIG. 1. A transparent flash cover 26 is mechanically connected to the flash circuit board 24 and is located in front of a flash tube 28 and a rear flash reflector (not shown). The flash tube 28 is conductively connected to the flash circuit board 24 (to be in the flash and light-emitting diode circuitry). A flash capacitor 30 for supplying electrical energy to the flash tube 28 to produce flash illumination of the subject being photographed is conductively connected to the flash circuit board 24 (to be in the flash and light-emitting diode circuitry). A spaced pair of slightly staggered positive and negative contact-holders 32 and 34 are conductively connected to the flash circuit board 24 (to be in the flash and light-emitting diode circuitry), and a single-piece pair of slightly staggered positive and negative contact-holders 36 and 38 are mechanically connected to the main body part 12. A pair of identical batteries 40 for providing electrical energy to the flash capacitor 30 are held between the two pairs of positive and negative contact-holders 32, 34 and 36, 38. A parallel pair of negative and positive synchronization contact-arms 42 and 44 are conductively connected to the flash circuit board 24 (to be in the flash and light-emitting diode circuitry).

A metal shutter blade 46 is supported on a fixed plastic pin 48, which projects from the main body part 12, for pivotal shutter opening to uncover the aperture 18 and for pivotal shutter closing to recover the aperture, to expose successive image areas of the filmstrip. See FIGS. 1–4. The shutter blade 46 is pivoted open in a clockwise direction in FIGS. 2 and 3 and is pivoted closed in a counter-clockwise direction in those FIGS. A shutter-closing return metal torsion spring 50 is mounted on the pin 48 over the shutter blade 46 and has one spring leg 52 held fast to the positive synchronization contact-arm 44 and another spring leg 54 held fast to the shutter blade at a blade tab 56.

A synchronization metal torsion spring 58 is mounted on an integral tab 60 of the negative synchronization contact-arm 42 and has one spring leg 62 held fast to the negative synchronization contact-arm and another spring leg 64 projecting freely from adjacent a stop tang 66 of the negative synchronization contact-arm to be able to be forcibly turned.

The camera 10 is intended to give two print formats, the "H" format and the "P" format as described previously in the BACKGROUND OF THE INVENTION. An optical film encoder, shown in FIG. 1 as a conventional light-emitting diode 68, is conductively connected to the flash circuit board 24 (to be in the flash and light-emitting diode circuitry) to receive electrical energy from the pair of batteries 40. The light-emitting diode 68 is located in a tunnel 70 in the main body part 12 and has a light-emitting head for providing film encoding illumination to expose the choice of the "P" format (rather than the "H" format) on a film edge area adjacent anyone of the exposed image areas of the filmstrip.

No matter which format "H" or "P" is chosen in the camera 10, the exposed image areas on the filmstrip are always in the "H" format. However, in order for the photographer to know how much of the subject will be included in the print, a viewfinder (not shown) in the camera 10 includes an adjustable masking device for framing the subject according to the selected format. The adjustable masking device readies the light-emitting diode 68 to provide film encoding illumination only when the selected format is "P".

Operation

Figure 2:
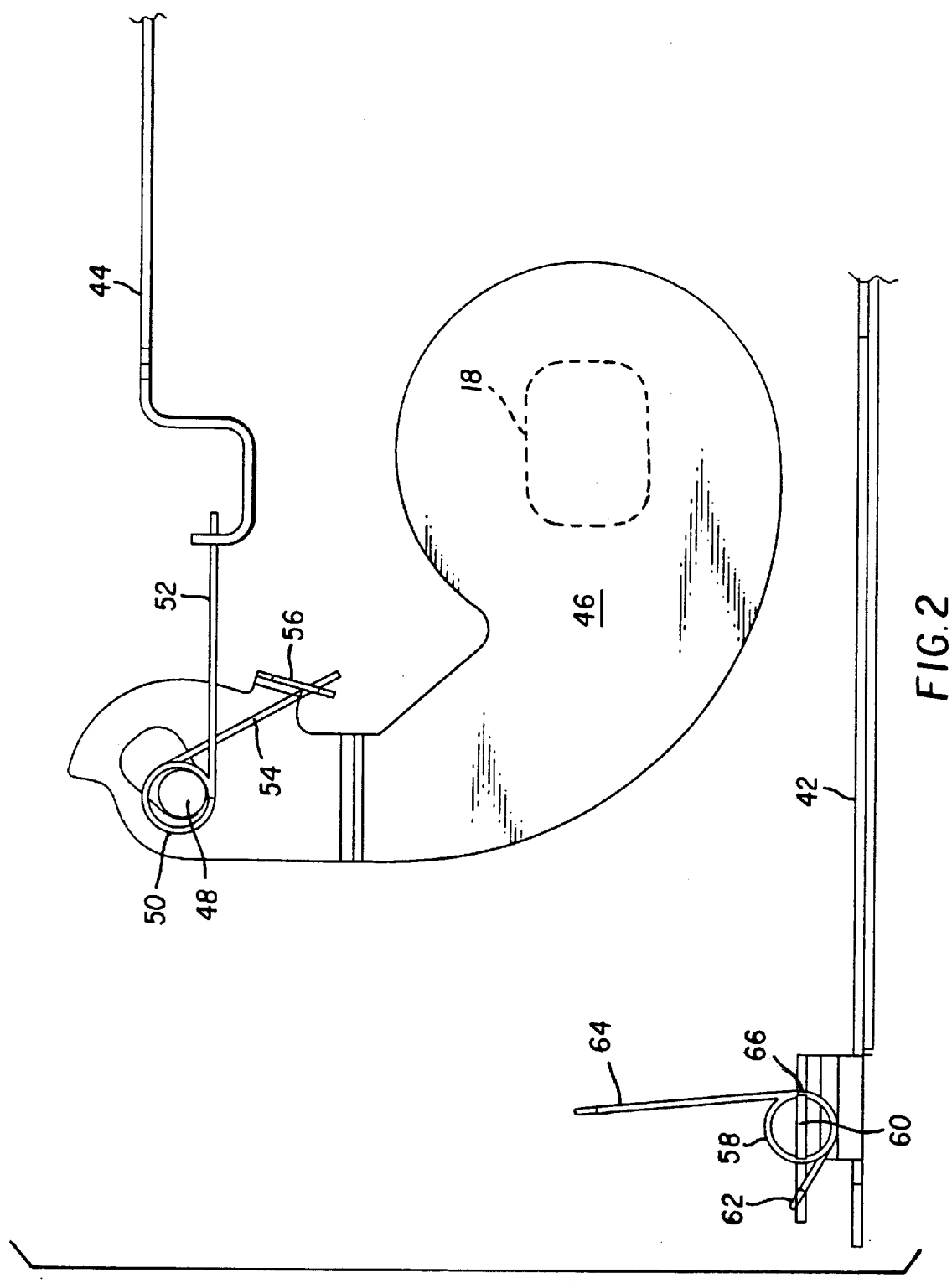

As shown in FIGS. 2 and 3, after shutter full-opening (i.e. after the front aperture 18 is completely uncovered) the shutter blade 46 continues to move in a clockwise direction to abut the spring leg 64 of the synchronization torsion spring 58 to immediately complete closure of the flash and light-emitting diode circuitry, similar to closing a normally open switch. This initiates flash illumination and permits the light-emitting diode 68 to provide film encoding illumination. As is well known, flash illumination is only for an instant, for example one millisecond. However, it is desired to sustain closure of the flash and light-emitting diode circuitry in order to prolong film encoding illumination. Film encoding illumination can be prolonged because the shutter blade 46 remains in touch with the spring leg 64 of the synchronization torsion spring 58 during continued movement of the shutter blade in the clockwise direction, to progressively turn the leg.

As shown in FIG. 4, when the shutter blade 46 is stopped at the stop tang 66 of the negative synchronization contact-arm 42, the shutter-closing return torsion spring 50 immediately reverses the shutter blade first to begin shutter closing and then to separate the shutter blade from the spring leg 64 of the synchronization torsion spring 58 as shown in FIG. 2. When the shutter blade 46 is separated from the spring leg 64 of the synchronization torsion spring 58, closure of the flash and light-emitting diode circuitry is discontinued, similar to opening a normally open switch.

The invention has been described with reference to a preferred embodiment. However, it will be appreciated that variations and modifications can be effected by a person of ordinary skill in the art without departing from the scope of the invention. For example, instead of the synchronization torsion spring 58 any other known spring or resilient device such as a helical compression spring or a leaf spring can be used.

PARTS LIST 10. one-time-use camera
12. main body part
14. electronic flash assembly
16. film exposure compartment
18. front aperture
20. film roll chamber
22. cartridge chamber
24. flash circuit board
26. transparent flash cover
28. flash tube
30. flash capacitor
32. positive contact-holder
34. negative contact-holder
36. positive contact-holder
38. negative contact-holder
40. pair of batteries
42. negative synchronization contact-arm
44. positive synchronization contact-arm
46. shutter blade
48. pin
50. shutter-closing return spring
52. spring leg
54. spring leg 56. blade tab
58. synchronization torsion spring
60. contact-arm tab
62. spring leg
64. spring leg
66. stop tang
68. light-emitting diode
70. tunnel

What is claimed is:

1. A camera comprising a flash circuit board, a shutter-flash synchronization contact conductively connected to said flash circuit board for synchronizing shutter opening and flash illumination, a shutter blade conductively connected to said flash circuit board and movable in a single direction against said synchronization contact as an incident of shutter opening to initiate flash illumination, and an optical film encoder conductively connected to said flash circuit board to receive electrical energy to provide film encoding illumination when said shutter blade is moved against said synchronization contact, is characterized in that:

said synchronization contact has a resilient extension-contact which is positioned for said shutter blade to move in the single direction against said extension-contact as an incident of shutter opening to initiate flash illumination and to permit said optical film encoder to begin to receive electrical energy to provide film encoding illumination, is positioned to remain in touch with said shutter blade during further movement of the shutter blade in the single direction to permit said optical film encoder to continue to receive electrical energy for providing film encoding illumination after flash illumination is initiated, and is a distortable spring element conductively connected to said synchronization contact and positioned for said shutter blade to move in the single direction against said spring element as an incident of shutter opening and then distort the spring element progressively during further movement of the shutter blade in the single direction.

2. A camera as recited in claim 1, wherein said spring element is a torsion spring having one spring leg held fast to said synchronization contact and another spring leg positioned for said shutter blade to move in the single direction against the spring leg as an incident of shutter opening and turn said other spring leg progressively during further movement of the shutter blade in the single direction.

3. A camera as recited in claim 1, wherein said synchronization contact has a stop tang positioned to provide a non-compliant stop for said shutter blade following distortion of said spring element during further movement of the shutter blade in the single direction.

4. A camera as recited in claim 3, wherein a shutter-closing return spring for said shutter blade conductively connects said flash circuit board and the shutter blade.

* * * * *